No. 726,145. PATENTED APR. 21, 1903.
S. C. DANIEL.
FLY SCREEN.
APPLICATION FILED NOV. 6, 1902.
NO MODEL.
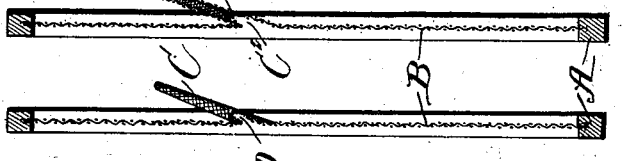
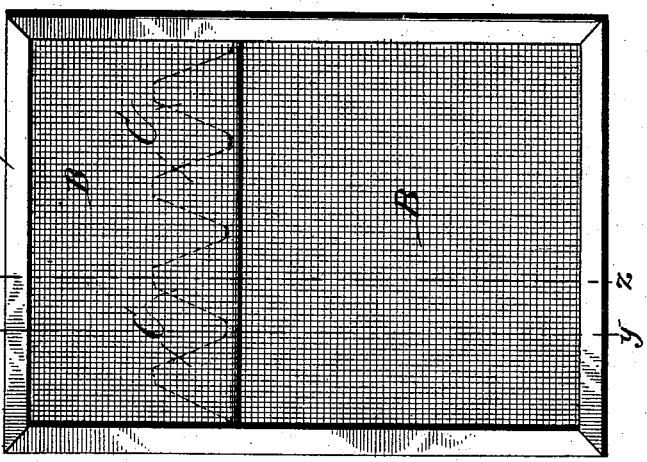
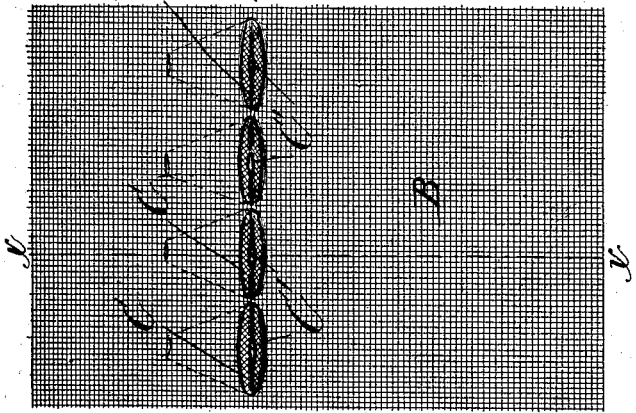
WITNESSES:
Geo. P. Kingsbury
Geo. S. Brock
INVENTOR
Samuel C. Daniel.
BY
ATTORNEYS.

UNITED STATES PATENT OFFICE.

SAMUEL COOPER DANIEL, OF GAS CITY, INDIANA.

FLY-SCREEN.

SPECIFICATION forming part of Letters Patent No. 726,145, dated April 21, 1903.

Application filed November 6, 1902. Serial No. 130,259. (No model.)

*To all whom it may concern:*

Be it known that I, SAMUEL COOPER DANIEL, of Gas City, in the county of Grant and State of Indiana, have invented a new and useful Improvement in Fly-Screens, of which the following is a specification.

My invention relates to an improvement in screens for windows and doors, and has for its object to provide a screen that shall in addition to serving the usual purpose of excluding flies and other insects also serve as a means of allowing egress of flies and other insects that may be in a room.

My invention consists in certain novel features of construction, arrangement, and combination of parts, as will be hereinafter fully described, and pointed out in the claims.

In the drawings, Figure 1 is a front elevation of the screen-body before it and the tapered tubes are bent into operative position, the final position of the tubes being indicated by dotted lines. Fig. 2 is a vertical section on line $x\ x$ of Fig. 1. Fig. 3 is a front elevation of the completed screen. Fig. 4 is a section on line $y\ y$ of Fig. 3. Fig. 5 is a vertical section on line $z\ z$ of Fig. 3.

In carrying out my invention I use a frame A of any suitable construction, to which is secured in any suitable manner the screen B. Said screen is composed of wire gauze or netting woven in the usual way, with this important exception: Flattened cone-shaped or tapering tubes or pockets C are arranged in one or more transverse rows across the width of the screen, projecting rearwardly or outwardly from the screen-body at any suitable point in its height, though preferably this row or rows will be placed as near the top of the screen as possible, as the natural travel of flies is nearly always upward. The outer or smaller end of said tubes C is open, as at C', and is of such restricted size as to only permit the egress of a fly, but will prevent or offer a great obstacle to the entrance of the fly from the outside. To complete the screen, the body portion is folded upon itself along a line about the center of the inner or larger opening $C^2$ of the pockets C, as indicated by the dotted line 1 2 in Fig. 1. By making the folds at this point I produce a transverse reentrant groove or channel D, as indicated in the sectional view Fig. 4, and at the same time the tubes or pockets C are bent upwardly and forwardly toward the outer face of the screen-body, but not against it, thereby forming and giving the tubes C an upwardly obliquely projecting direction entirely without or beyond the plane of the screen-body. The purpose of this construction is to overcome the possible contingency of a fly crawling along the outer surface of the screen and entering the restricted opening at the outer end of said tubes, as might be done if said tubes lay flat against the outer face.

The inner or larger ends of the tubes C are placed very close together and lying within the transverse groove D lie directly in the path of flies crawling upwardly on the inner surface of the screen, so that they are guided into said tubes and crawl toward the smaller and outer open ends.

As flies almost invariably travel upwardly and toward the light, it will be seen that should they alight on the inner surface of the screen the possibility of their passing out the restricted openings toward the light is very strong. Again, by projecting the outer ends of the tapering tubes upwardly and outwardly away from the outer surface of the screen should any flies crawl downwardly or across the outer surface of the screen, which is extremely unlikely, they will not reach the restricted outer open ends of the tubes and pass through the screen from the outside to the inside.

It will be seen that I provide a screen which will effectually exclude flies from a room and one which forms means of egress of flies that may have gathered in the room.

By my method or process of folding the screen and bending the tapering exit-tubes I do away with all joints, patching, or extraneous means of fastening the parts together.

The completed screen may be fastened to the face of the frame A, or its edges may be inserted and held in saw-kerfs in the inner edges of the frame, or the screen may be fastened between two-part frames.

The tapering tubes may be of any suitable length, and their outer ends when bent upward will set away from the body of the screw a short distance—say about one-fourth or three-eighths of an inch. It is also obvious that the screen and frame may be made any size or shape to fit any window or door.

Having thus described my invention, what I claim as new, and desire to secure by Letters Patent, is—

1. A fly-screen comprising a frame, a woven-wire screen-body portion secured thereto and having a transverse row of elongated openings adjacent to each other, an integral flattened tapering woven-wire tube extending outwardly from each opening, said tubes having a restricted opening at their outer ends, said body portion being folded downwardly on the median line of the elongated openings to form a transverse guide groove or channel leading to the tapered tubes, said tubes being bent upwardly and inwardly toward the outer face of the body portion but not in contact therewith.

2. The process of forming fly-screens which consists first, in weaving a screen-body with a transverse row of elongated openings, secondly in weaving integral elongated tapering tubes open at their outer ends outwardly from said elongated openings, thirdly in bending the screen-body downwardly on the horizontal median line of said elongated openings, and finally in folding the elongated tapering tubes upwardly and inwardly toward the outer face of the screen-body, but not in contact therewith.

SAMUEL COOPER DANIEL.

Witnesses:
PATRICK T. HOVEY,
EDWARD BLOCK.